United States Patent
Sjöland et al.

(10) Patent No.: US 11,910,322 B2
(45) Date of Patent: Feb. 20, 2024

(54) WAKEUP RECEIVER AND SYSTEM USING FREQUENCY SHIFT KEYING AND SHIFTED-FREQUENCY RETRANSMISSION

(71) Applicant: Telefonaktiebolaget LM Ericsson (publ), Stockholm (SE)

(72) Inventors: Henrik Sjöland, Lund (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 180 days.

(21) Appl. No.: 17/413,244

(22) PCT Filed: Dec. 13, 2018

(86) PCT No.: PCT/EP2018/084851
§ 371 (c)(1),
(2) Date: Jun. 11, 2021

(87) PCT Pub. No.: WO2020/119914
PCT Pub. Date: Jun. 18, 2020

(65) Prior Publication Data
US 2022/0078714 A1 Mar. 10, 2022

(51) Int. Cl.
*H04L 27/12* (2006.01)
*H04W 52/02* (2009.01)
*H04L 27/14* (2006.01)

(52) U.S. Cl.
CPC ......... *H04W 52/0235* (2013.01); *H04L 27/12* (2013.01); *H04L 27/14* (2013.01)

(58) Field of Classification Search
CPC ..... H04W 52/0235; H04L 27/12; H04L 27/14
(Continued)

(56) References Cited

U.S. PATENT DOCUMENTS 9,065,698 B2   6/2015  Shirakata et al.
2006/0274698 A1*  12/2006  Twitchell, Jr. ........ H04W 36/14
                                                             370/328
(Continued)

FOREIGN PATENT DOCUMENTS

EP    1164708 A2    12/2001
JP    2011049721 A    3/2011
(Continued)

OTHER PUBLICATIONS

Sjöland, H. et al., "Ultra Low Power Transceivers for Wireless Sensors and Body Area Networks", 8th International Symposium on Medical Information and Communication Technology, Apr. 2-4, 2014, pp. 1-5, IEEE.
(Continued)

*Primary Examiner* — Dang T Ton
(74) *Attorney, Agent, or Firm* — COATS & BENNETT, PLLC

(57) ABSTRACT

A limited-function, low-power wakeup receiver is based on frequency shift keying (FSK), avoiding the inherent problems of AM demodulation such as non-linearity of the amplitude detector. The FSK detector is easily realized in the digital domain. Due to the time discrete nature of FSK signals, the detector has a periodic response in frequency, allowing the signal to be demodulated at different offsets from the center frequency. The relaxed accuracy demands on the local oscillator frequency avoid the need for a power-hungry phase locked loop (PLL) circuit. To avoid potential loss if a signal coincides with one of the regular sensitivity nulls, the network at least occasionally transmits an FSK wakeup signal at a slightly shifted frequency, so at least one of the FSK wakeup signals will be received. Transmitting multiple frequency-shifted signals improves the likelihood of reception.

30 Claims, 10 Drawing Sheets

(58) Field of Classification Search
USPC .................................... 370/329, 400, 406
See application file for complete search history.

(56) References Cited

U.S. PATENT DOCUMENTS

| | | |
|---|---|---|
| 2011/0182223 A1 | 7/2011 | Patel et al. |
| 2012/0120859 A1 | 5/2012 | Stephens et al. |
| 2015/0087255 A1 | 3/2015 | Wentzloff et al. |
| 2016/0127161 A1 | 5/2016 | Murali et al. |
| 2018/0184379 A1 | 6/2018 | Liu et al. |

FOREIGN PATENT DOCUMENTS

| | | |
|---|---|---|
| WO | 2009132425 A1 | 11/2009 |
| WO | 2014028247 A1 | 2/2014 |
| WO | 2018049924 A1 | 3/2018 |
| WO | 2018108264 A1 | 6/2018 |
| WO | 2018174941 A1 | 9/2018 |
| WO | 2018204908 A1 | 11/2018 |
| WO | 2020007485 A1 | 1/2020 |

OTHER PUBLICATIONS

Bryant, C. et al., "A 2.45GHz, 50uW Wake-up Receiver Front-end with −88dBm Sensitivity and 250kbps Data Rate", 40th European Solid State Circuits Conference, Sep. 22-26, 2014, pp. 235-238, IEEE.

Sjöland, H. et al., "A Receiver Architecture for Devices in Wireless Body Area Networks", IEEE Journal on Emerging and Selected Topics in Circuits and Systems, Mar. 2012, pp. 82-95, vol. 2, No. 1.

Pletcher, N. et al., "A 52 uW Wake-Up Receiver With—72 dBm Sensitivity Using an Uncertain-IF Architecture", IEEE Journal of Solid-State Circuits, Jan. 2009, pp. 269-280, vol. 44, No. 1.

* cited by examiner

WAKEUP RECEIVER AND SYSTEM USING FREQUENCY SHIFT KEYING AND SHIFTED-FREQUENCY RETRANSMISSION

TECHNICAL FIELD

The present invention relates generally to wireless communication, and in particular to wakeup receiver techniques using frequency shift keying and frequency shifted transmissions.

BACKGROUND

Wireless communication networks, including geographically fixed network nodes and often mobile radio network devices such as cellphones and smartphones, are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation (4G) of network standards has been deployed, and the fifth generation (5G, also known as New Radio, or NR) is in development.

Cellular wireless communication systems are currently being developed and improved for machine-to-machine (M2M) or machine type communication (MTC), which is characterized by lower demands on data rates than, e.g., mobile broadband, but with higher requirements on aspects such as low cost device design (e.g., below USD $5), and very long battery life (device lifetime). In Release 13, the Third Generation Partnership Project (3GPP) standardized two different approaches for MTC. Enhanced MTC (eMTC), also known as Long Term Evolution-Machine-to-machine (LTE-M), includes cost reduction measures such as lower bandwidth, lower data rates, and reduced transmit power, as compared to legacy (broadband) LTE. Narrowband Internet of Things (NB IoT) more aggressively addresses the extremely low cost market with less than 200 kHz of channel bandwidth and flexibility to be deployed concurrently with legacy networks or outside of active legacy spectrum.

An important aspect to M2M and MTC type device design is ultra-low power consumption. For example, it is envisioned that sensors and other devices may be deployed with a battery that outlasts the useful device life, such as 10 years. Another approach to powering M2M/MTC devices is energy scavenging, where power is captured and stored (e.g., in a battery or capacitor) from, e.g., solar cells, temperature or salinity gradients, kinetic energy, and the like. In such devices, power management is a major design concern. Selective activation—e.g., sleep mode—is heavily exploited. While it is straightforward to only activate circuits to serve the device's needs, such as to transmit sensed or accumulated data, connectivity is a two-sided activity, and the device must consume power to "listen" to the network if it is to be reachable.

One approach to conserving power while operating a receiver is to activate it on a duty cycle, with dormant periods between receiver activations. Such a receiver activation duty cycle directly affects the response time—the lower the duty cycle, the longer the network must on average repeat the paging messages to contact the device. Repeated paging messages consume air interface resources, increase interference to other devices, and may cause congestion in heavy traffic loads. A lower duty cycle also necessarily increases the delay for obtaining a response from the device.

Another approach is to utilize a very low-power, limited-function receiver, called a "wakeup" receiver, which is operated at a higher duty cycle (or even continuously) and consumes far less power than a main receiver. The wake-up receiver's functionality is limited to detecting a wakeup request from the network. Upon such detection, the wake-up receiver alerts the device (e.g., a power management system), which brings the main receiver out of sleep mode to establish connectivity and engage the device's full communications capabilities.

To achieve ultra-low power consumption (e.g., below 100 uW), the wakeup receiver is typically based on amplitude detection of on-off keying (OOK) signals. This avoids the need for highly accurate local oscillator (LO) clock signals, which are typically generated by power-hungry phase locked loop (PLL) circuits. However, due to the resulting inaccuracy and uncertainty in a local oscillator frequency, only relatively wideband filtering can be realized prior to the amplitude detection. In this case, immunity to interference is essentially limited to what can be achieved by correlation of PN-sequences.

Due to the limited amount of filtering prior to amplitude detection, the wakeup receivers are very vulnerable to interference. All interference and noise entering the amplitude detector, having amplitude modulation in the same frequency range as the wakeup message, will mask the signal. It is not necessary that the interference utilize the same frequency channel. Rather, because of the limited ability to filter out signals adjacent to the wakeup signal, signals transmitted in adjacent channels, and potentially even further away (in frequency), will effectively have as detrimental an effect as a co-channel interferer. More narrowband filtering would eliminate most such interference; however the accurate frequency generation required for that would consume significant power, defeating the purpose of the wakeup receiver.

Compounding the interference problem, the amplitude detector is also heavily non-linear and therefore produces very small outputs for weak input signals. For example, assuming a quadratic gain characteristic for small signals means that the signal to noise ratio (SNR) falls off by 20 dB for each reduction of 10 dB of the received signal level. With even modest amounts of interference at the detector input, the gain is therefore often insufficient for reliable operation with small input signal amplitudes.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, a wakeup receiver is based on frequency shift keying (FSK) instead of amplitude modulation (AM). The inherent problems of AM-demodulation are then avoided. Most importantly, the non-linearity of the amplitude detector, which is a severe bottleneck in receiving weak signals, is removed from the signal chain. The FSK detector is easily realized in the digital domain, and due to the time discrete nature of digital signals, it has a periodic response in frequency (also known as frequency folding). Wakeup receivers according to embodiments of the present invention exploit this property by demodulating FSK at different offsets from the center frequency. This does not impose high accuracy demands on the local oscillator frequency, and a power-hungry phase locked loop (PLL) is therefore not necessary. However, the sensitivity of the receiver is very low at regular frequencies—that is, there are periodic "nulls" in the transfer function. To address this potential loss of reception, the network at least occasionally transmits the FSK wakeup signal at a slightly shifted frequency. The delay between an FSK wakeup signal transmission and a frequency-shifted transmission is significantly smaller than the time for the wakeup receiver frequency to drift, resulting in at least one of the FSK wakeup signals being received at a frequency where the receiver has good sensitivity. FSK wakeup signals (and frequency-shifted ones) are transmitted often, so that wakeup receivers can continuously keep their center frequency and filter bandwidth tuned for best reception. In some embodiments, because FSK detection is wideband, channel filters in a wakeup receiver are set to different bandwidths. Wider filters are used to speed up acquisition and finding proper oscillator settings to generate the proper center frequency, and more narrow filters are employed during tracking.

One embodiment relates to a method of operating a low-power wakeup receiver in a wireless device operative in a wireless communication network. Operation of a primary receiver circuit is suspended to conserve power. A limited-function, low-power wakeup receiver circuit is operated. A wakeup signal transmitted by the network at a first frequency is received. The wakeup signal is transmitted using Frequency Shift Keying (FSK), wherein a state of an information bit is encoded as a positive or negative offset from the first frequency. The wake-up signal is frequency down-converted from the first frequency to a second frequency lower than the first frequency. The received FSK wakeup signal is demodulated at the second frequency using first and second matched filters in the discrete time domain. The first filter is configured to detect odd numbered members of an ordered set of equidistant frequencies, and reject even numbered ones. A separation between two frequencies in the ordered set is equal to two times the offset frequency of the FSK signal. The second filter is configured to detect even numbered members of the ordered set and reject odd numbered ones. In this manner, data modulated onto the FSK wakeup signal is recovered. If the demodulated data identifies the wireless device, operation of the primary receiver circuit is resumed.

Another embodiment relates to a wireless device operative in a wireless communication network. The wireless device includes a primary receiver circuit adapted to be suspended to conserve power, and further adapted to resume operation if data demodulated from a received wakeup signal identifies the wireless device. The wireless device further includes a limited-function, low-power wakeup receiver circuit. The wakeup receiver circuit is adapted to receive a wakeup signal transmitted by the network at a first frequency. The wakeup signal is transmitted using Frequency Shift Keying (FSK), wherein a state of an information bit is encoded as a positive or negative offset from the first frequency. The wakeup receiver circuit includes a digitally controlled oscillator adapted to generate a local oscillator signal, and a mixer adapted to frequency down-convert the wake-up signal from the first frequency to a second frequency lower than the first frequency. The wakeup receiver circuit further includes a demodulator comprising first and second matched filters in the discrete time domain. The first filter is configured to detect odd numbered members of an ordered set of equidistant frequencies, and reject even numbered ones. A separation between two frequencies in the ordered set is equal to two times the offset frequency of the FSK signal. The second filter is configured to detect even numbered members of the ordered set and reject odd numbered ones. In this manner, data modulated onto the FSK wakeup signal is demodulated.

Yet another embodiment relates to a method of operating a base station serving one or more low-power wireless devices in a wireless communication network. A first wakeup signal is generated at a first frequency. The first wakeup signal is transmitted using Frequency Shift Keying (FSK), wherein a state of an information bit is encoded as a positive or negative frequency offset from the first frequency. The first FSK wakeup signal is transmitted. A second FSK wakeup signal is generated at a second frequency, shifted from the first FSK wakeup signal frequency. The second FSK wakeup signal is transmitted after the first FSK wakeup signal.

Still another embodiment relates to a base station operative to serve one or more low-power wireless devices in a wireless communication network. The base station includes a transceiver and processing circuitry operatively connected to the transceiver. The processing circuitry is adapted to generate a first wakeup signal at a first frequency. The first wakeup signal is transmitted using Frequency Shift Keying (FSK), wherein a state of an information bit is encoded as a positive or negative frequency offset from the first frequency. The processing circuitry is further adapted to transmit the first FSK wakeup signal; generate a second FSK wakeup signal at a second frequency, shifted from the first FSK wakeup signal frequency; and transmit the second FSK wakeup signal after transmitting the first FSK wakeup signal.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
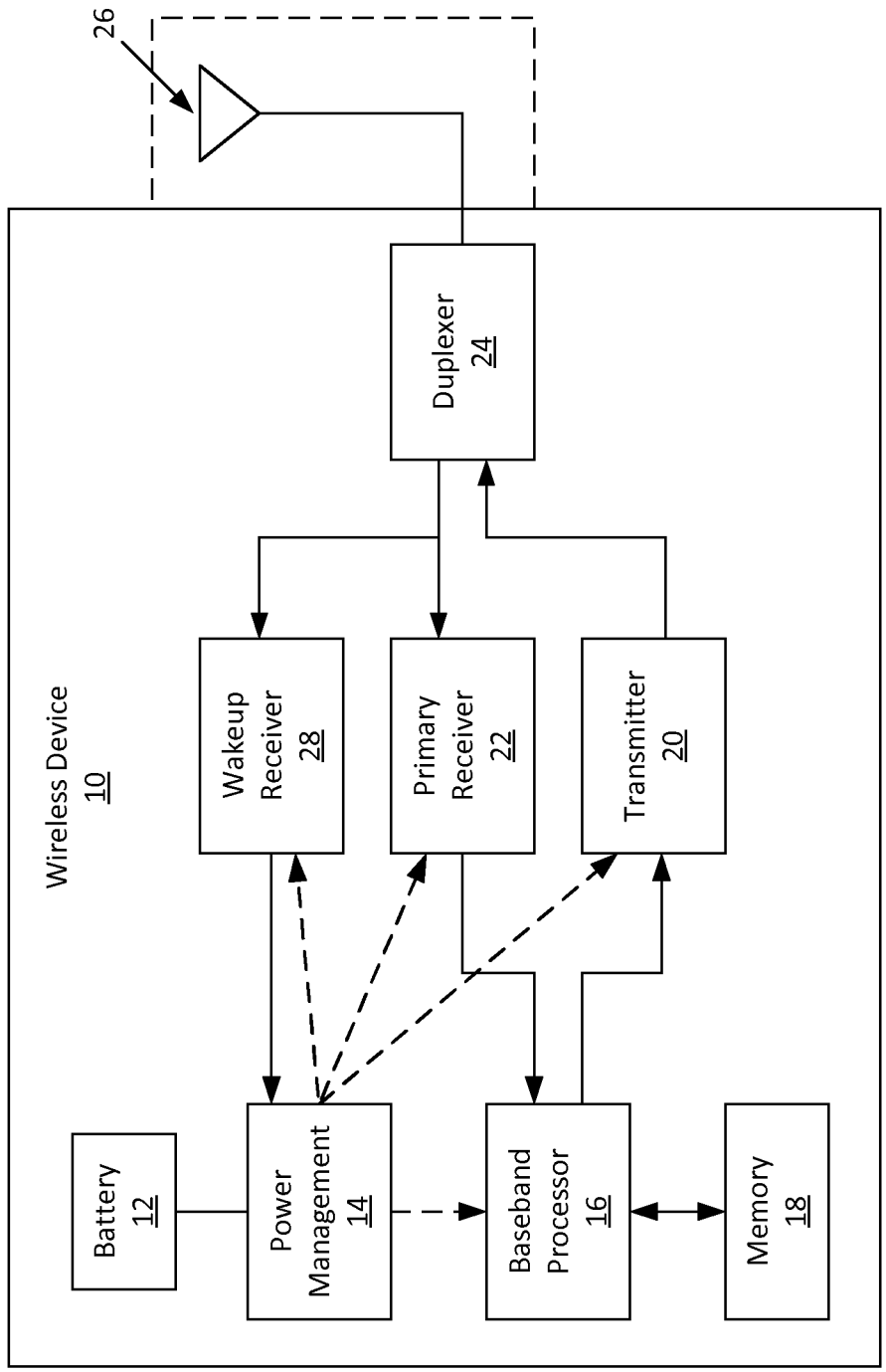
FIG. 1 is a block diagram of a wireless device.

FIG. 1 depicts functional blocks of a wireless device 10 according to one embodiment. The wireless device 10 includes a battery 12 (or power scavenging device), power management circuit 14, and baseband processor 16 connected to memory 18. When actively connected to a wireless network, the baseband processor 16 communicates with the network (e.g., a base station) via a transmitter 20 and primary receiver 22. A duplexer 24 provides isolation between FDD transmit and receive functions (which could be a switch in a TDD implementation), in connecting them both to an antenna 26 (which may be internal or external, as indicated by the dashed lines). Of course, the wireless device 10 may include other functions not depicted in FIG. 1, such as sensors, cameras, monitors, actuators, control circuits, other communication interfaces, a user interface, and the like, depending on the specific purpose of the wireless device 10.

As indicated by dashed arrows, the power management circuit 14 controls the provision of power (and/or clock signals) to other circuits and functions of the wireless device 10. In particular, the power management circuit 14 places circuits in a "sleep," or inactive mode, when the relative functionality is not being currently utilized, to conserve power. As discussed above, the power management circuit 14 may efficiently and accurately control the provision of power to circuits such as the baseband processor 16 and transmitter 20, in response to current computational or outgoing communication demands. However, the wireless device 10 has no knowledge when incoming communications, such as paging messages, may be directed to it from the network, and continuously monitoring the network consumes large amounts of power. While the power management circuit 14 can reduce the power consumption of the primary receiver 22 by operating it in a duty cycle, this results in wasted air interface resources, increased interference, and possible congestion as the network is required to repeatedly transmit paging messages until one coincides with a primary receiver 22 "on" time.

Accordingly, the wireless device includes a wakeup receiver 28. The wakeup receiver 28 is a low-power, limited-functionality circuit, the purpose of which is to monitor the network for an indication of pending transmissions directed to the wireless device 10 when operation of the primary receiver 22 is suspended for power savings. This indication may be in the form of a wakeup signal transmitted by the network and identifying the wireless device 10 (or a group, of which the wireless device 10 is a member). Upon detecting such a signal, the wakeup receiver alerts the power management circuit 14, which in turn activates the primary receiver 22, which e.g., monitors the network for paging messages, performs a random access procedure, or otherwise engages in conventional (and higher power consuming) communication protocols with the network. When the wireless device 10 completes a task, or otherwise believes no further network transmissions directed to it are likely for a time, the power management circuit 14 again suspends operation of the primary receiver 22, and activates the wakeup receiver 28.

Figure 2:
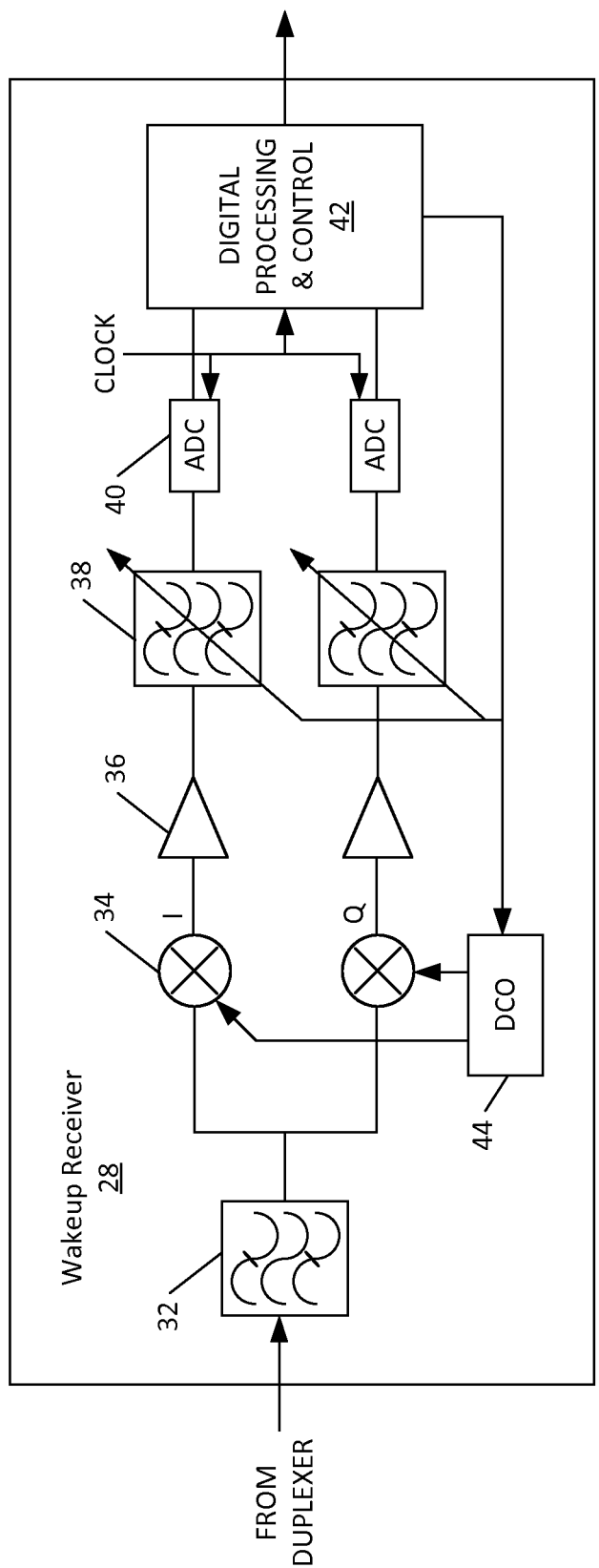
FIG. 2 is a block diagram of a wakeup receiver circuit.

FIG. 2 depicts the architecture of a wakeup receiver 28 according to one embodiment. The wakeup receiver 28 is a limited-function, low-power receiver intended to be activated by a wireless device 10 when a primary, full-function receiver 22 is in "sleep" mode for power conservation. The wakeup receiver 28 searches for a wakeup signal transmitted by the network (e.g., by a base station or eNB). If the decoded wakeup signal includes an ID of the wireless device 10, the wakeup receiver 28 outputs a signal to the wireless device 10—such as to a power management system 14 on the wireless device 10—to activate the primary receiver 22. The primary receiver 22 may then receive broadcasts such as System Information, and search for paging messages. In this manner, the wireless device 10 may remain dormant, in a very low power consumption mode, for extended periods. However, during such dormant times, the wireless device 10, via the wakeup receiver 28, continues to monitor network transmissions, and hence the network need not repeat paging messages directed to the wireless device 10 when it has downlink data to transfer.

The wakeup receiver 28 comprises a front-end filter 32, mixer(s) 34, amplifier(s) 36, narrowband filter(s) 38, Analog to Digital (ADC) converter(s) 40, digital processing and control logic 42, and a Digitally Controlled Oscillator (DCO) 44. The dual paths depicted in FIG. 2 reflect In-phase (I) and Quadrature (Q) mixing, although other mixers 34 may be employed. Operation of the wakeup receiver 28 is straightforward to those of skill in the art. A signal received at an antenna 26 (FIG. 1), and passed through a duplexer 24 for isolation from transmitter circuits 20, is initially filtered by front-end filter 32. Mixers 34 frequency downconvert received signals by mixing them with Local Oscillator (LO) signals generated by the DCO 44, under the control of control logic 42. The mixer 34 is a passive structure, to minimize power consumption and flicker noise. Because the mixer 34 precedes the baseband amplifiers 36 and filters 38, the signal frequency is low, and narrowband filtering can be applied to minimize interference, reducing the dynamic range needed in the ADCs 40. Further filtering and signal processing is then performed in the digital domain, in digital processing circuits 42. If data decoded from a received wakeup signal indicate the wakeup signal targeted the wireless device 10 (for example, the data match a unique identifier of the wireless device 10, such as IMSI, C-RNTI, or the like), the primary receiver 22 is activated to receive further messages from the network.

The DCO 44 is the major power consumer of the wakeup receiver 28. To minimize power consumption, no external frequency reference, such as a crystal oscillator, is used. Furthermore, phase locked loop designs are avoided, as they are heavy consumers of power. In one embodiment, a ring oscillator is used in the DCO 44 for ultra-low power consumption. Due to these power-saving design considerations, the DCO 44 is neither highly accurate nor particularly stable. That is, the output frequency of the DCO 44 LO signal will drift over time.

Figure 3:
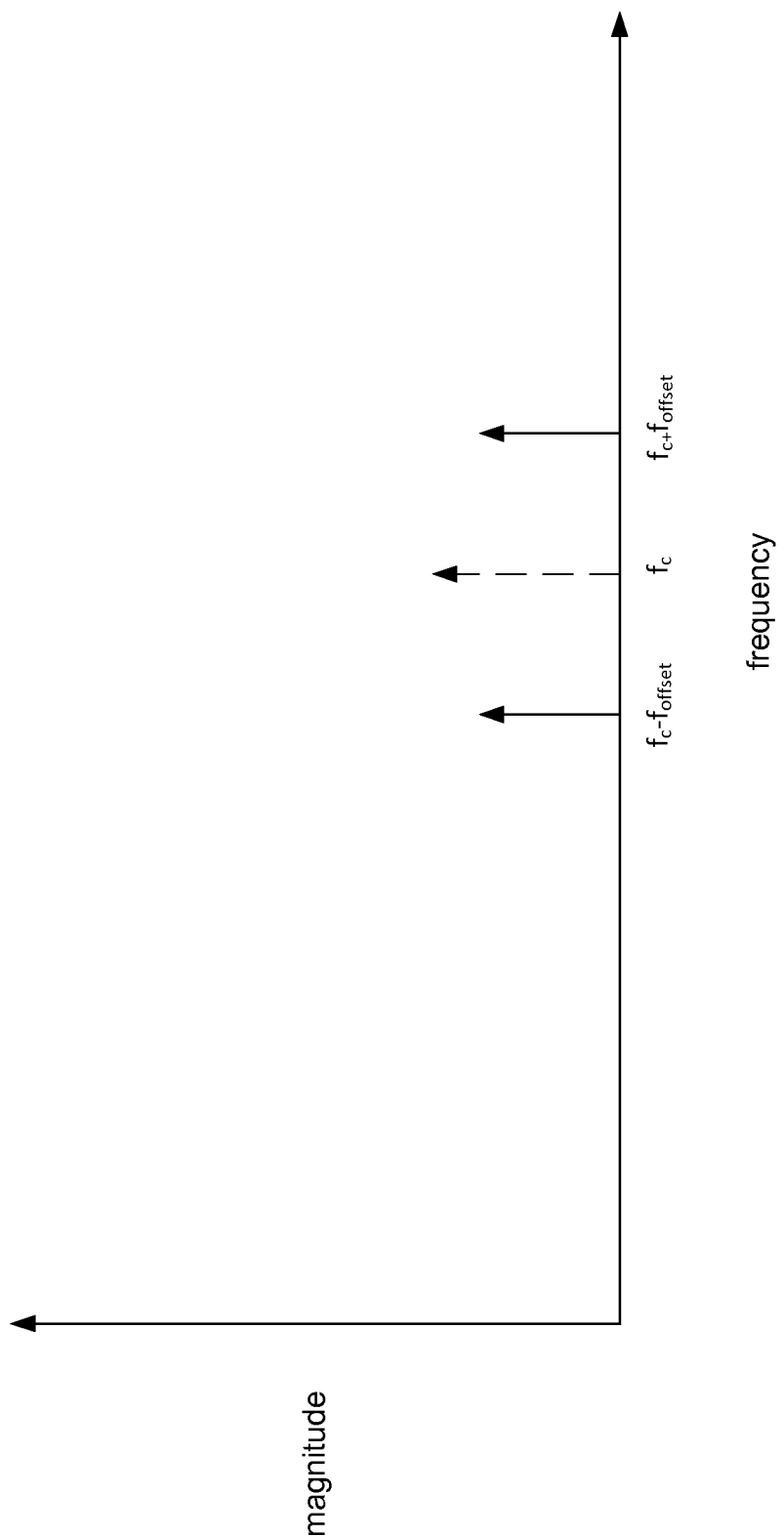
FIG. 3 is a frequency domain diagram of a Frequency Shift Keying (FSK) modulated signal.

The demodulation of the wake-up signal is performed in the digital processing circuit 42. The signal is modulated using FSK, in which a state of an information bit is encoded as a positive or negative offset from a carrier frequency. FIG. 3 depicts FSK, where $f_c$ denotes a center, or carrier, frequency. A digital "1" is represented by a tone at frequency $f_c+f_{offset}$, and a digital "0" is represented by a tone at frequency $f_c-f_{offset}$ (or vice versa). At the wakeup receiver 28, the frequency of the FSK wakeup signal is detected from discrete time signal samples. A highly efficient FSK demodulator using discrete samples is presented in the papers, H. Sjöland et al., "A Receiver Architecture for Devices in Wireless Body Area Networks", IEEE Journal on Emerging and Selected Topics in Circuits and Systems (JETCAS), pp. 82-95, March 2012, and H. Sjöland et al., "Ultra Low Power Transceivers for Wireless Sensors and Body Area Networks", International Symposium on Medical and Communication Technology (ISMICT), pp. 1-5, 2014.

The FSK demodulation is performed using two matched filters, one for a transmitted negative frequency offset ($f_c-f_{offset}$), and one for a transmitted positive offset ($f_c+f_{offset}$). The sign of the frequency offset contains the digital information to receive: for example, a negative offset could mean a digital zero, and a positive a digital one (or vice versa). The modulation index is chosen so that each symbol represents a full 360 degrees rotation of the complex baseband signal. The sample rate is chosen to be four samples per symbol. The matched filters are then very simple to implement, as the signal will rotate 90 degrees between each sample, clockwise or counterclockwise. The two matched filters consist of multiplying the samples of a symbol by 1, j, −1, −j and 1, −j, −1, j, respectively, and then summing the result. These multiplications are very easy to realize for a baseband signal in I, Q representation, by swapping the I, Q signals and the signs. This demodulation also suppresses flicker noise and DC-offsets, as the sum of coefficients in the filters are zero. A DC input will therefore result in a zero output of the filters.

Figure 4:
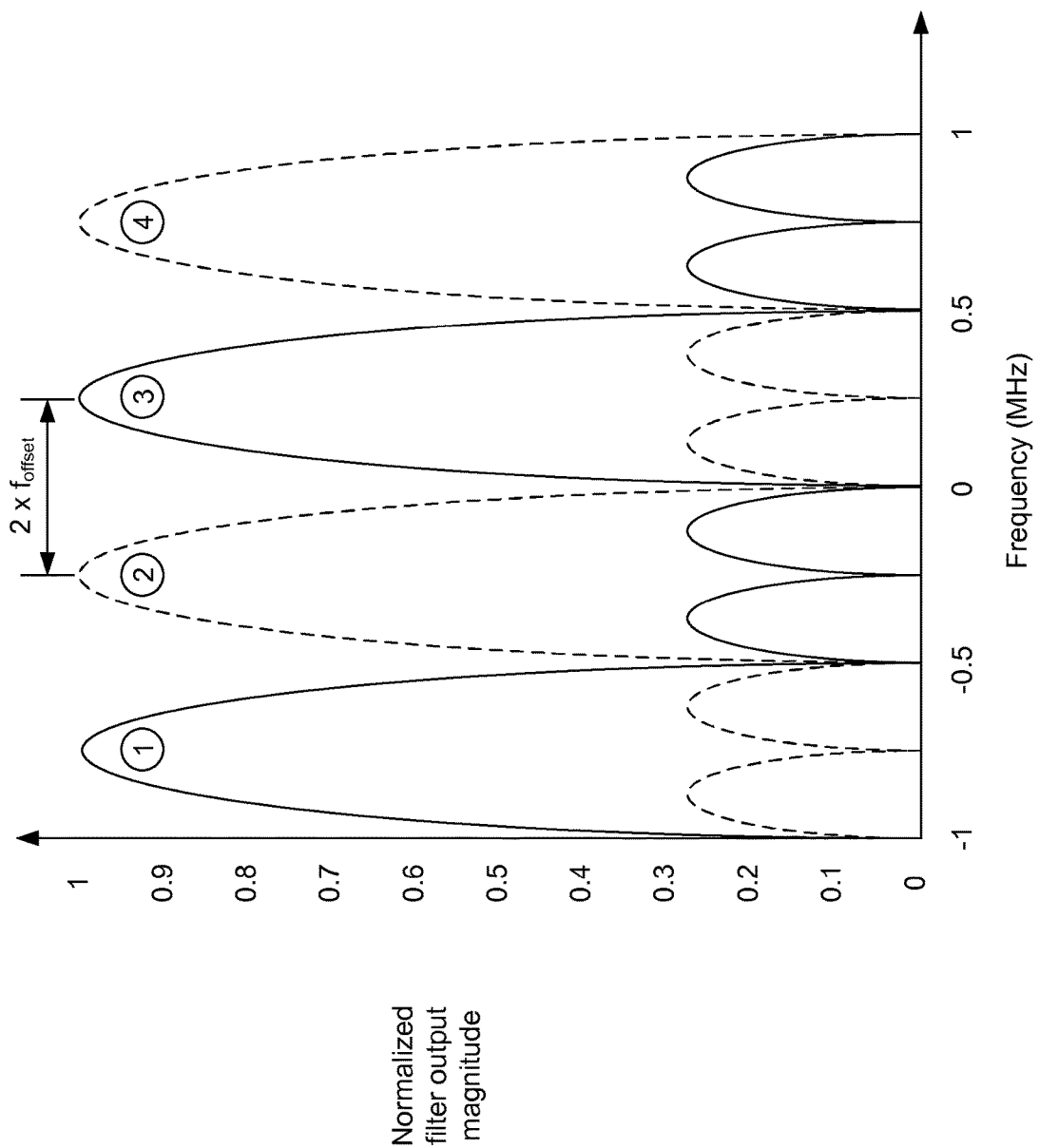
FIG. 4 is a frequency domain graph of the outputs of discrete time domain matched filter FSK signal demodulators.

FIG. 4 depicts the periodic response of the two matched filters (one solid and one dashed-line) for a sample rate of 1 MHz. Since one filter detects the positive offset tone and the other the negative, the filter outputs are separated by two times the offset frequency. As FIG. 4 shows, not only will the filters detect the rotations of the signal at the targeted offset frequencies of ¼ of the sample rate, but each filter will also detect offset frequencies an integer number of sample rates higher or lower. This is normally an undesired property, requiring filtering (or otherwise discarding) the duplicate responses. However, according to embodiments of the present invention, this feature is exploited to increase the wakeup receiver robustness. In a wake-up receiver 28, the DCO 44 is not locked to a reference in a phase locked loop, since that would consume too much power. This makes the local oscillator (LO) frequency uncertain, and at baseband the wakeup signal could have higher offset frequencies, positive or negative. The FSK demodulator will anyway demodulate the signal, as long as the frequency separation between the two FSK tones is twice the offset frequency, or ½ the sample rate.

The frequencies corresponding to the matched filter peak outputs are collected in an ordered set. Arbitrarily beginning by numbering a first frequency, detected by one filter, as 1, the other filter will detect the next frequency numbered 2, and so on. One example of such numbering is indicated in FIG. 4. Hence, the first filter detects all odd-numbered frequencies in the ordered set and rejects the even-numbered ones. Similarly, the second filter detects the even-numbered frequencies in the ordered set, and rejects the odd-numbered ones. The frequencies in the ordered set are equidistant, and the separation between two frequencies in the ordered set is equal to twice the offset frequency of the FSK signal.

Depending on the offset frequency, however, which matched filter detects the lower frequency tone and which detects the higher may switch. Furthermore, at certain frequency offsets, the two tones will be located at zero response of the filters, if they occur at DC or plus/minus integer multiples of half the sample rate. Both of these factors must be addressed for the wake-up receiver to be reliable.

The uncertainty of which filter detects which tone can be addressed by correlating for both polarities of the wakeup signal. A single correlator is used; it yields a positive result for the regular polarity of the wakeup message, and a negative result for the inverse, where each bit has been reversed (or vice versa). In one embodiment, the network transmits the wakeup signal with an initial preamble in the message, which is known a priori by the receiver. Once the preamble is detected, the polarity is known for the rest of that wakeup signal.

Figure 5:
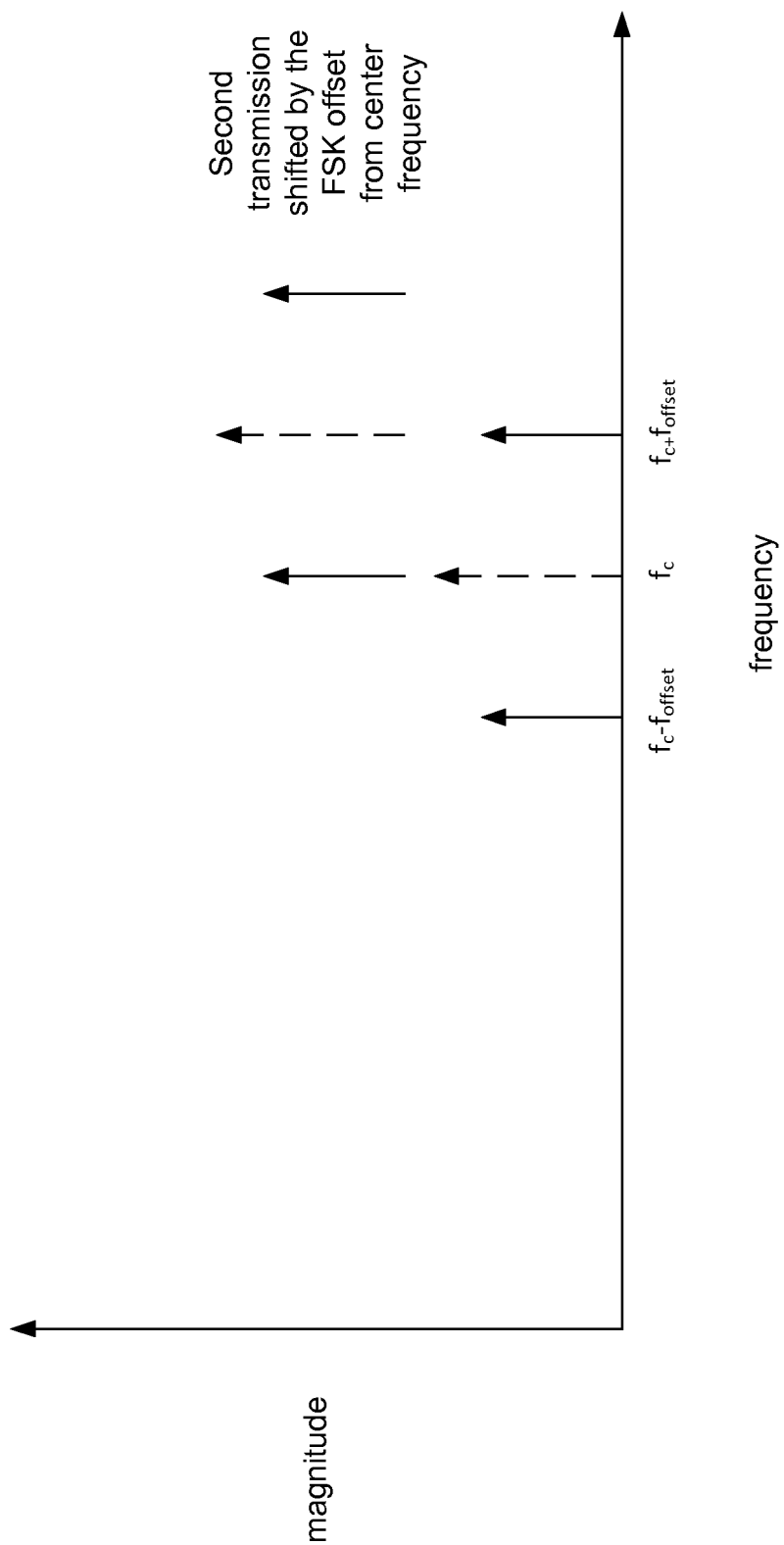
FIG. 5 is a frequency domain diagram of a frequency-shifted FSK signal.

To eliminate the risk of a wakeup signal being lost by coinciding with zeros in the matched filter responses, the wakeup signal is at least occasionally re-transmitted shortly after a first transmission, at a shifted center frequency. In one embodiment, as depicted in FIG. 5, the re-transmission is shifted by the FSK offset frequency $f_{offset}$, which may for example be 250 kHz. By making the re-transmission soon after the first transmission, the local oscillator will not have experienced any significant frequency drift. If the first message was lost due to the zeros in the transfer function of the filter response, the second one will be received with close to maximum gain. The maximum frequency error will occur if the two transmissions occur at frequencies located symmetrically at each side of a zero in the matched filter responses, or symmetrically at each side of a peak. In this case both situations yield a frequency error of ½ of the offset frequency, i.e., 125 kHz in FIG. 4.

Transmitting the shifted-frequency wakeup signal increases power consumption; however, this occurs at the transmitter, where power consumption is typically not a concern. In addition, the shifted-frequency wakeup signal is quite short, and only transmitted relatively seldom, for example, for a duration of 100-200 µs sent every 10 s, so the increase in channel usage is also insignificant.

If higher performance is required, more shifted-frequency transmissions are made. In one embodiment, three wakeup signals are transmitted, with two being shifted, relative to the third, in frequency by −⅔ and ⅔ of the FSK offset frequency (that is, yielding wakeup signals at −⅔, 0, and ⅔ of the offset frequency). In this embodiment, the maximum error is ⅓ of the offset frequency, which is equal to 83 kHz in FIG. 4. In another embodiment, four wakeup signals are transmitted, with frequency shifts of −¾, −¼, ¼, and ¾ of the FSK offset frequency, relative to a nominal center, or carrier frequency. In this embodiment, the maximum error is ¼ of the offset frequency, which is equal to 62.5 kHz in FIG. 4.

Figure 6:
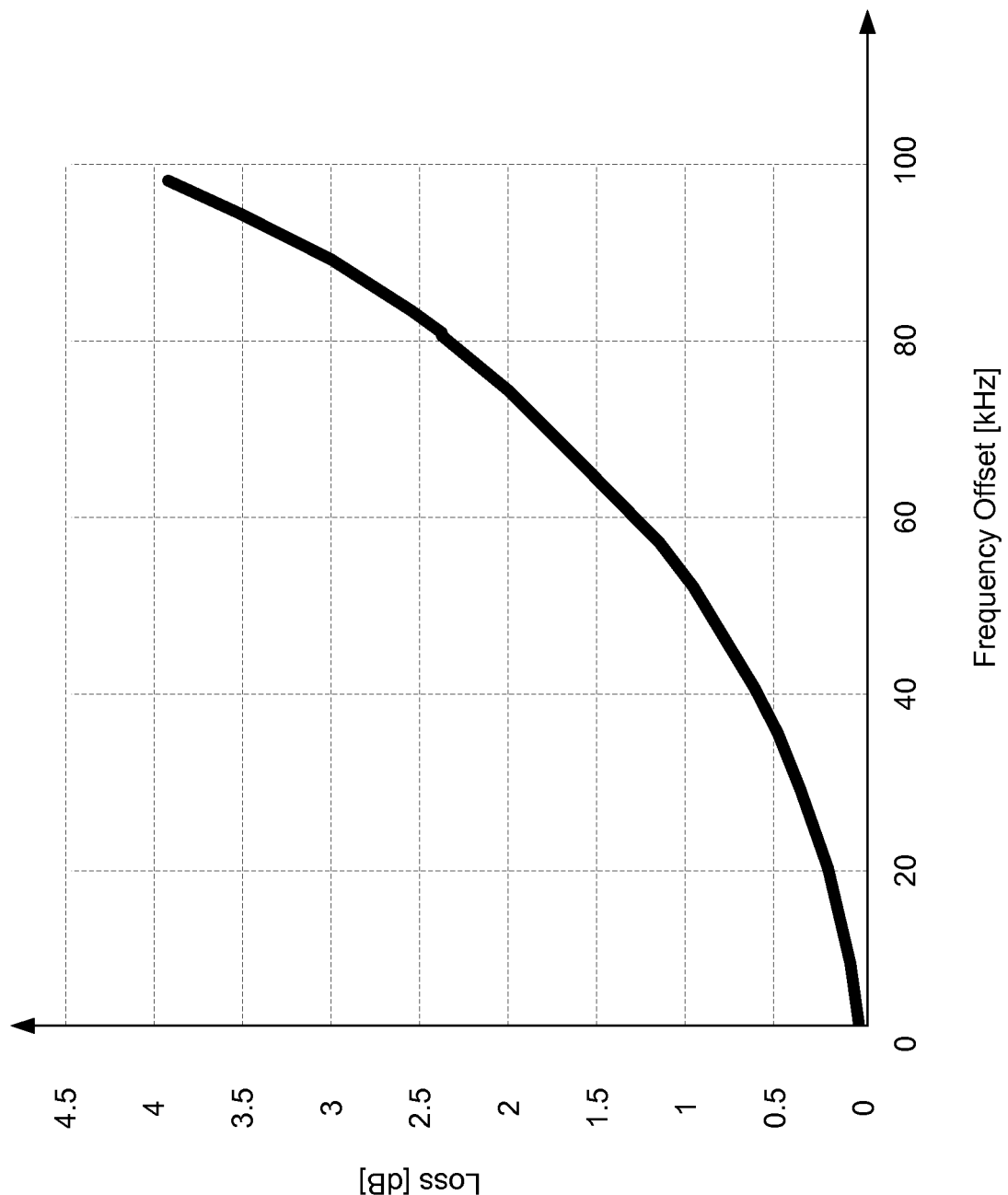
FIG. 6 is a graph depicting loss of sensitivity as a function of frequency error.

FIG. 6 depicts the loss in sensitivity due to frequency errors, for different Bit Error Rates (BER). In a wake-up receiver 28 the raw bit error rate can be quite high, so the curve for BER=10' is relevant. As can be seen with four shifted-frequency wakeup signal transmissions, yielding a maximum error of 62.5 kHz, the sensitivity is degraded by less than 1.5 dB. With three shifted-frequency wakeup signal transmissions, yielding an error of 83 kHz, the degradation is about 3 dB. With two shifted-frequency wakeup signal transmissions the maximum error is outside the graph, but the maximum degradation can be estimated to slightly above 5 dB. To summarize, the minimum number of shifted-frequency wakeup signal transmissions for robust operation is two, but better performance is achieved with three or four, while using more than four shifted-frequency wakeup signal transmissions yields diminishing returns.

In one embodiment, different modes of the wakeup receiver circuit 28 are used when acquiring the FSK wakeup signal sequence, and when staying tuned by tracking it. For example, wider bandwidth filters 38 are used during signal acquisition, such as when the wakeup receiver circuit 28 is activated, following inactivation of the primary receiver circuit 22. The wideband filters speed up the signal acquisition, and finding the proper DCO setting for generating the right center frequency. Then, more narrowband filters 38 are employed while tracking the FSK wakeup signals, to provide the best immunity to interference. In some embodiments, there is a gradual transition, using shrinking filter bandwidths, between these modes.

Figure 7:
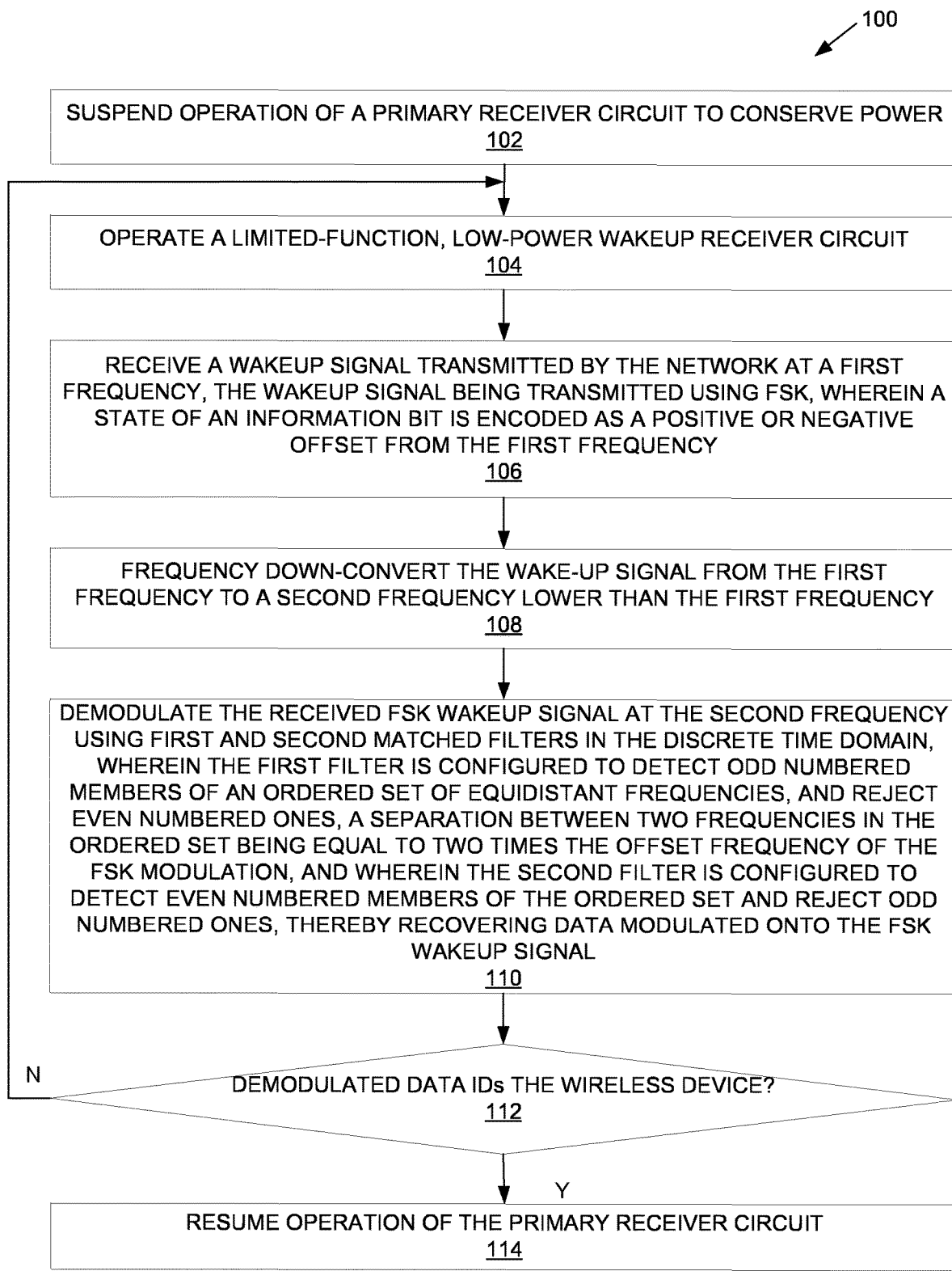
FIG. 7 is a flow diagram of a method of operating a low-power wakeup receiver in a wireless device operative in a wireless communication network.

FIG. 7 depicts a method 100 of operating a low-power wakeup receiver 28 in a wireless device 10 operative in a wireless communication network, in accordance with particular embodiments. Operation of a primary receiver circuit 22 is suspended to conserve power (block 102). A limited-function, low-power wakeup receiver circuit is operated (block 104). A wakeup signal, transmitted by the network at a first frequency, is received (block 106). The wakeup signal is transmitted using Frequency Shift Keying (FSK), wherein a state of an information bit is encoded as a positive or negative offset from the first frequency. The first received FSK wakeup signal is frequency down-converted from the first frequency to a second frequency lower than the first frequency (block 108). The received FSK wakeup signal is demodulated at the second frequency using first and second matched filters in the discrete time domain. The first filter is configured to detect odd numbered members of an ordered set of equidistant frequencies, and reject even numbered ones. A separation between two frequencies in the ordered set is equal to two times the offset frequency of the FSK signal. The second filter is configured to detect even numbered members of the ordered set and reject odd numbered ones. In this manner, data modulated onto the FSK wakeup signal is recovered (block 110). If the demodulated data identifies the wireless device 10 (block 112), operation of the primary receiver circuit 22 is resumed (block 114).

Figure 8:
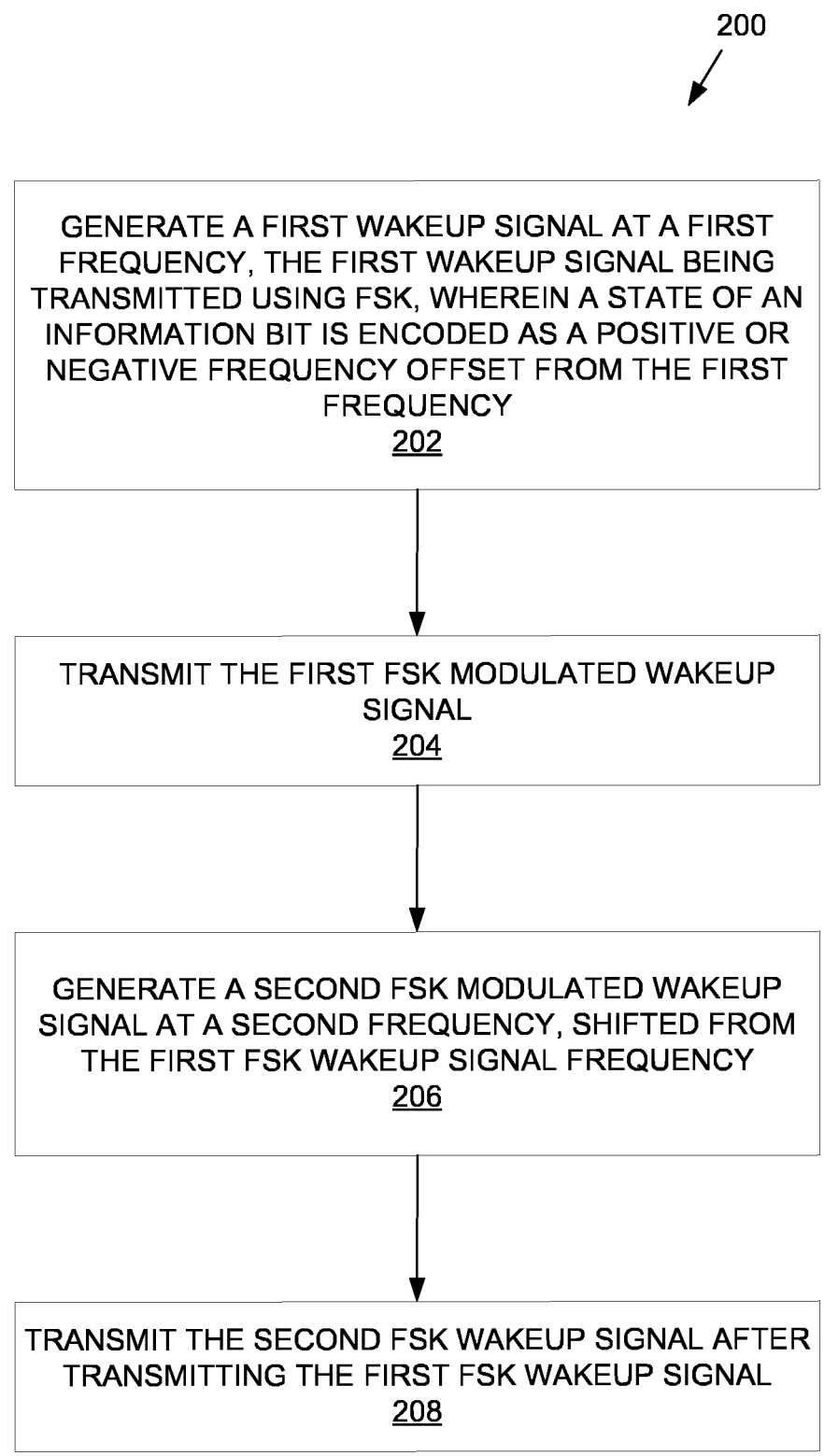
FIG. 8 is a flow diagram of a method of operating a base station serving one or more low-power wireless devices in a wireless communication network.

FIG. 8 depicts a method 200 of operating a base station serving one or more low-power wireless devices 10 in a wireless communication network, in accordance with other particular embodiments. A first wakeup signal is generated at a first frequency (block 202). The first wakeup signal is transmitted using Frequency Shift Keying (FSK), wherein a state of an information bit is encoded as a positive or negative frequency offset from the first frequency. The first FSK wakeup signal is transmitted (block 204). A second FSK wakeup signal is generated at a second frequency (block 206). The second FSK wakeup signal frequency is shifted from the first FSK wakeup signal frequency by the FSK offset frequency or a fraction thereof. The second FSK wakeup signal is transmitted after transmitting the first FSK wakeup signal (block 208).

Apparatuses described herein may perform the methods 100, 200 described herein, and any other processing, by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

As described above, FIG. 1 for example illustrates a wireless device 10 as implemented in accordance with one or more embodiments. In general, a wireless device 10 is any type of device capable of communicating with a network node and/or base station using radio signals. A wireless device 10 may therefore refer to a machine-to-machine (M2M) device, a machine-type communications (MTC) device, a Narrowband Internet of Things (NB IoT) device, etc. The wireless device 10 may also be a User Equipment (UE); however it should be noted that the UE does not necessarily have a "user" in the sense of an individual person owning and/or operating the device. A wireless device 10 may also be referred to as a radio device, a radio communication device, a wireless communication device, a wireless terminal, or simply a terminal—unless the context indicates otherwise, the use of any of these terms is intended to include device-to-device UEs or devices, machine-type devices, or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be configured to transmit and/or receive data without direct human interaction.

A wireless device 10 as described herein may be, or may be comprised in, a machine or device that performs monitoring or measurements, and transmits the results of such monitoring measurements to another device or a network node. Particular examples of such machines are power meters, industrial machinery, or home or personal appliances, e.g. refrigerators, televisions, personal wearables such as watches etc. In other scenarios, a wireless device 10 as described herein may be comprised in a vehicle and may perform monitoring and/or reporting of the vehicle's operational status or other functions associated with the vehicle.

Figure 9:
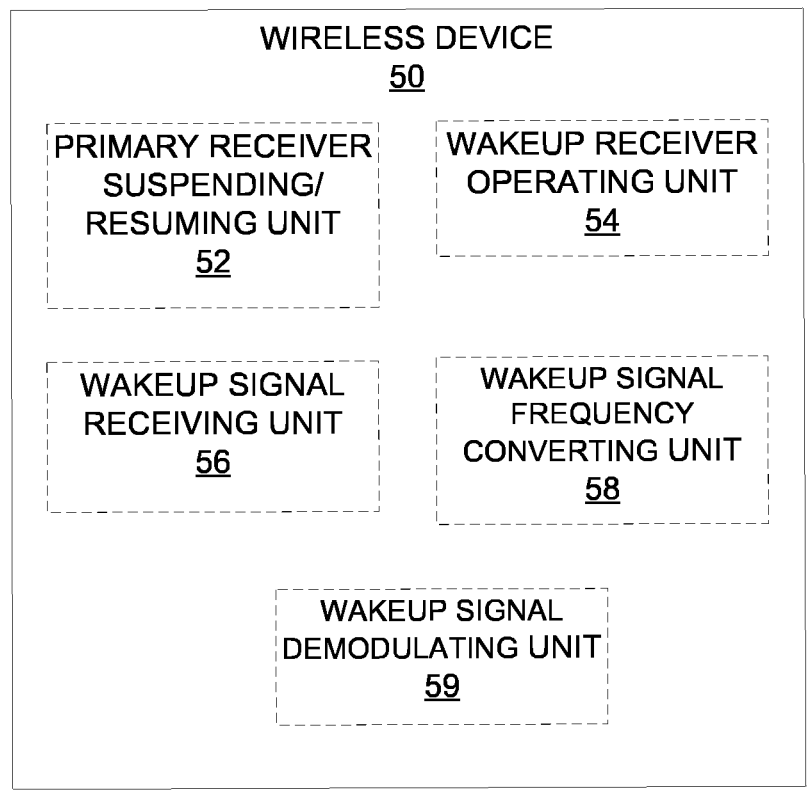
FIG. 9 is a block diagram of a wireless device showing functional units.

FIG. 9 illustrates a schematic block diagram of a wireless device 50 operative in a wireless communication network according to still other embodiments. As shown, the wireless device 50 implements various functional means, units, or modules, e.g., via the baseband processor 16, power management circuit 14, primary receiver 22, or wakeup receiver 28 in FIG. 1 and/or via software code. These functional means, units, or modules, e.g., for implementing method 100 herein, include for instance: primary receiver suspending/resuming unit 52, wakeup receiver operating unit 54, wakeup signal receiving unit 56, wakeup signal frequency converting unit 58, and wakeup signal demodulating unit 59.

The primary receiver suspending/resuming unit 52 is configured to suspend operation of a primary receiver circuit 22 to conserve power. If a received wakeup signal identifies the wireless device 50, the primary receiver suspending/resuming unit 52 is further configured to resume operation of the primary receiver circuit 22. The wakeup receiver operating unit 54 is configured to operate a limited-function, low-power wakeup receiver circuit 28. The wakeup signal receiving unit 56 is configured to receive a wakeup signal transmitted by the network at a first frequency, the wakeup signal being transmitted using FSK, wherein a state of an information bit is encoded as a positive or negative offset from the first frequency. The wakeup signal frequency converting unit 58 is configured to frequency down-convert the wake-up signal from the first frequency to a second frequency lower than the first frequency. The wakeup signal demodulating unit 59 is configured to demodulate the received FSK wakeup signal at the second frequency using first and second matched filters in the discrete time domain, wherein the first filter is configured to detect odd numbered members of an ordered set of equidistant frequencies, and reject even numbered ones, a separation between two frequencies in the ordered set being equal to two times the offset frequency of the FSK signal, and wherein the second filter is configured to detect even numbered members of the ordered set and reject odd numbered ones, thereby recovering data modulated onto the FSK wakeup signal.

Figure 10:
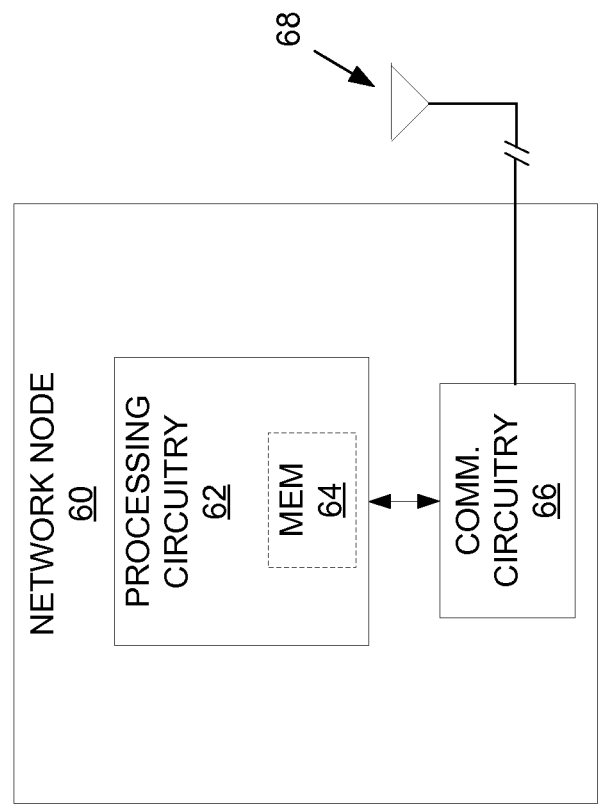
FIG. 10 is a block diagram of a network node.

FIG. 10 illustrates a network node 60 as implemented in accordance with one or more embodiments. In particular, the network node 60 may function as a base station in a wireless communication network. As those of skill in the art are aware, a base station is a network node 60 providing wireless communication services to one or more wireless devices 10 in a geographic region (known as a cell or sector). The base station 60 in LTE is called an e-NodeB or eNB; in NR it is known as gNB. However the present invention is not limited to LTE or NR. As shown, the network node 60 includes processing circuitry 62 and communication circuitry 66. The communication circuitry 66 is configured to transmit and/or receive information to and/or from one or more other nodes, e.g., via any communication technology. The communication circuitry 66 is connected to one or more antennas 68, to effect wireless communication across an air interface to one or more wireless devices 10. As those of skill in the art are aware, and as indicated by the continuation lines in the antenna feed line of FIG. 10, the antenna(s) 68 may be physically located separately from the network node 60, such as mounted on a tower, building, or the like. Although the memory 64 is depicted as being internal to the processing circuitry 62, those of skill in the art understand that the same or additional memory 64 may be separate from the processing circuitry 62. Those of skill in the art additionally understand that virtualization techniques allow some functions nominally executed by the processing circuitry 62 to actually be executed by other hardware, perhaps remotely located (e.g., in the so-called "cloud"). The processing circuitry 62 is configured to perform processing described above, such as by executing instructions stored in memory 64. The processing circuitry 62 in this regard may implement certain functional means, units, or modules.

Figure 11:
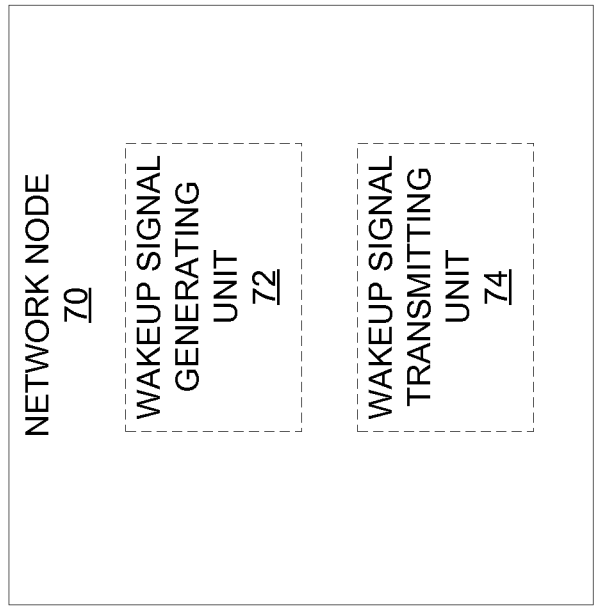
FIG. 11 is a block diagram of a network node showing functional units.

FIG. 11 illustrates a schematic block diagram of a network node 70 in a wireless network according to still other embodiments. As shown, the network node 70 implements various functional means, units, or modules, e.g., via the processing circuitry 62 in FIG. 10 and/or via software code. These functional means, units, or modules, e.g., for implementing the method 200 herein, include for instance: wakeup signal generating unit 72 and wakeup signal transmitting unit 74.

The wakeup signal generating unit 72 is configured to generate a first wakeup signal at a first frequency, the first wakeup signal being transmitted using Frequency Shift Keying (FSK), wherein a state of an information bit is encoded as a positive or negative frequency offset from the first frequency. The wakeup signal generating unit 72 is further configured to generate a second FSK wakeup signal at a second frequency, shifted from the first FSK wakeup signal frequency. The wakeup signal transmitting unit 74 is configured to transmit the first FSK wakeup signal, and is further configured to transmit the second FSK wakeup signal after transmitting the first FSK wakeup signal.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present invention present numerous advantages over the prior art. FSK enables the use of an ultra-low power wakeup receiver. The severe limitations in sensitivity of conventional, amplitude modulation wakeup receivers are avoided, as the FSK wakeup receiver only utilizes linear processing. The response of the FSK detector is wideband, although it operates at low clock rate, which reduces sensitivity to local oscillator frequency errors. Because the FSK detection is wideband, the channel filters in the receiver can be set to different bandwidths for different detection frequency ranges. If FSK wakeup signals are broadcast regularly, wakeup receivers can continuously maintain their center frequency and filter bandwidth tuned for best reception. Different modes of the receiver can be used when acquiring the FSK wakeup signal sequence, and when staying tuned by tracking it. For example, wider bandwidths can be used to speed up acquisition and finding the proper DCO setting generating the right center frequency, and more narrow filters during tracking for best immunity to interference. There can also be a transition using shrinking filter bandwidths.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of operating a low-power wakeup receiver in a wireless device operative in a wireless communication network, comprising:
   suspending operation of a primary receiver circuit to conserve power;
   operating a limited-function, low-power wakeup receiver circuit;
   receiving a wakeup signal transmitted by the network at a first frequency, the wakeup signal being transmitted using Frequency Shift Keying (FSK), wherein a state of an information bit is encoded as a positive or negative offset from the first frequency;
   frequency down-converting the wake-up signal from the first frequency to a second frequency lower than the first frequency;
   demodulating the received FSK wakeup signal at the second frequency using first and second matched filters in the discrete time domain, wherein the first filter is configured to detect odd numbered members of an ordered set of equidistant frequencies, and reject even numbered ones, a separation between two frequencies in the ordered set being equal to two times the offset frequency of the FSK signal, and wherein the second filter is configured to detect even numbered members of the ordered set and reject odd numbered ones, thereby recovering data modulated onto the FSK wakeup signal; and
   if the demodulated data identifies the wireless device, resuming operation of the primary receiver circuit.

2. The method of claim 1 further comprising correlating the demodulated data to known data, to resolve ambiguity, introduced by frequency drift of the low-power wakeup receiver, as to which matched filter is demodulating the transmitted positive or negative frequency offset.

3. The method of claim 2 wherein the FSK wakeup signal comprises a preamble and a payload, and wherein receiving and demodulating the FSK wakeup signal comprises:
   correlating the demodulated data to the preamble to resolve the ambiguity as to which filter is demodulating the transmitted positive or negative frequency offset; and
   decoding the FSK wakeup signal payload to determine whether it addresses the wireless device.

4. The method of claim 1 wherein a modulation index of the FSK wakeup signal is chosen such that each symbol represents a full 360 degrees rotation of a complex baseband signal.

5. The method of claim 4 wherein the wakeup receiver circuit sample rate is 4 samples per symbol.

6. The method of claim 5 wherein
   the first matched filter is configured to multiply samples of a symbol by 1, j, −1, −j and sum the result; and
   the second matched filter is configured to multiply samples of a symbol by 1, −j, −1, j and sum the result.

7. A wireless device operative in a wireless communication network comprising:
   a primary receiver circuit adapted to be suspended to conserve power, and further adapted to resume operation if data demodulated from a received FSK wakeup signal identifies the wireless device;
   a limited-function, low-power wakeup receiver circuit adapted to receive a wakeup signal transmitted by the network at a first frequency, the wakeup signal being transmitted using Frequency Shift Keying (FSK), wherein a state of an information bit is encoded as a positive or negative offset from the first frequency, the wakeup receiver circuit comprising:
      a digitally controlled oscillator adapted to generate a local oscillator signal;
      a mixer adapted to frequency down-convert the wake-up signal from the first frequency to a second frequency lower than the first frequency; and
      a demodulator comprising first and second matched filters in the discrete time domain, wherein the first filter is configured to detect odd numbered members of an ordered set of equidistant frequencies, and reject even numbered ones, a separation between two frequencies in the ordered set being equal to two times the offset frequency of the FSK signal, and wherein the second filter is configured to detect even numbered members of the ordered set and reject odd numbered ones, thereby demodulating data modulated onto the FSK wakeup signal.

8. The wireless device of claim 7 further comprising a correlating circuit configured to correlate the demodulated data to known data, to resolve ambiguity, introduced by frequency drift of the low-power wakeup receiver (28), as to which filter is demodulating the transmitted positive or negative frequency offset.

9. The wireless device of claim 7 wherein the FSK wakeup signal comprises a preamble and a payload, and wherein receiving and demodulating the FSK wakeup signal comprises:
   correlating the demodulated data to the preamble to resolve the ambiguity as to which filter is demodulating the transmitted positive or negative frequency offset; and
   decoding the FSK wakeup signal payload to determine whether it addresses the wireless device.

10. The wireless device of claim 7 wherein a modulation index of the FSK wakeup signal is chosen such that each symbol represents a full 360 degrees rotation of the complex baseband signal.

11. The wireless device of claim 10 wherein the wakeup receiver circuit sample rate is 4 samples per symbol.

12. The wireless device of claim 11 wherein
   the first matched filter is configured to multiply samples of a symbol by 1, j, −1, −j and sum the result; and
   the second matched filter is configured to multiply samples of a symbol by 1, −j, −1, j and sum the result.

13. A method of operating a base station serving one or more low-power wireless devices in a wireless communication network, comprising:
   generating a first wakeup signal at a first frequency directed to a wireless device or group of wireless devices, the first wakeup signal being transmitted using Frequency Shift Keying (FSK), wherein a state of an information bit is encoded as a positive or negative frequency offset from the first frequency;

transmitting the first FSK wakeup signal;
generating a second FSK wakeup signal at a second frequency directed to the same wireless device or group of wireless devices, shifted from the first FSK wakeup signal frequency; and
transmitting the second FSK wakeup signal after transmitting the first FSK wakeup signal.

14. The method of claim 13 wherein the second FSK wakeup signal is shifted in frequency from the first FSK wakeup signal by an amount equal to or less than the offset from the center frequency that encodes an information bit as positive or negative.

15. The method of claim 14 wherein the second FSK wakeup signal is shifted in frequency from the first FSK wakeup signal by an amount equal to the offset.

16. The method of claim 14 wherein the second FSK wakeup signal frequency is shifted from the first FSK wakeup signal frequency by ½ of the offset frequency.

17. The method of claim 14 further comprising
generating a third FSK wakeup signal; and
transmitting the third FSK wakeup signal after transmitting the second FSK wakeup signal;
wherein the first and third FSK wakeup signals are shifted in frequency from the second FSK wakeup signal by −⅔ and ⅔ of the offset frequency, respectively.

18. The method of claim 14 further comprising
generating third and fourth FSK wakeup signal; and
sequentially transmitting the first, second, third, and fourth FSK wakeup signals;
wherein the first, second, third, and fourth FSK wakeup signals are shifted in frequency from a nominal FSK wakeup signal center frequency by −¾, −¼, ¼, and ¾ of the offset frequency, respectively.

19. The method of claim 13 wherein the second FSK wakeup signal is transmitted for a shorter duration than the first FSK wakeup signal.

20. The method of claim 13 wherein the second FSK wakeup signal is transmitted less frequently than the first FSK wakeup signal.

21. The method of claim 13 wherein a delay between transmitting the first and second FSK wakeup signals is less than a time required for a frequency of a wireless device wakeup receiver circuit local oscillator signal to drift beyond a predetermined tolerance.

22. A base station operative to serve one or more low-power wireless devices in a wireless communication network, comprising:
a transceiver; and
processing circuitry operatively connected to the transceiver, and adapted to
generate a first wakeup signal at a first frequency directed to a wireless device or group of wireless devices, the first wakeup signal being transmitted using Frequency Shift Keying (FSK), wherein a state of an information bit is encoded as a positive or negative frequency offset from the first frequency;
transmit the first FSK wakeup signal;
generate a second FSK wakeup signal at a second frequency directed to the same wireless device or group of wireless devices, shifted from the first FSK wakeup signal frequency; and
transmit the second FSK wakeup signal after transmitting the first FSK wakeup signal.

23. The base station of claim 22 wherein the second FSK wakeup signal is shifted in frequency from the first FSK wakeup signal by an amount equal to or less than the offset from the center frequency that encodes an information bit as positive or negative.

24. The base station of claim 23 wherein the second FSK wakeup signal is shifted in frequency from the first FSK wakeup signal by an amount equal to the offset.

25. The base station of claim 23 wherein the second FSK wakeup signal frequency is shifted from the first FSK wakeup signal frequency by ½ of the offset frequency.

26. The base station of claim 23 wherein the processing circuitry is further adapted to
generate a third FSK wakeup signal; and
transmit the third FSK wakeup signal after transmitting the second FSK wakeup signal;
wherein the first and third FSK wakeup signals are shifted in frequency from the second FSK wakeup signal by −⅔ and ⅔ of the offset frequency, respectively.

27. The base station of claim 23 wherein the processing circuitry is further adapted to
generate third and fourth FSK wakeup signal; and
sequentially transmit the first, second, third, and fourth FSK wakeup signals;
wherein the first, second, third, and fourth FSK wakeup signals are shifted in frequency from a nominal FSK wakeup signal center frequency by −¾, −¼, ¼, and ¾ of the offset frequency, respectively.

28. The base station of claim 22 wherein the processing circuitry is adapted to transmit the second FSK wakeup signal for a shorter duration than the first FSK wakeup signal.

29. The base station of claim 22 wherein the processing circuitry is adapted to transmit the second FSK wakeup signal less frequently than the first FSK wakeup signal.

30. The base station of claim 22 wherein a delay between transmitting the first and second FSK wakeup signals is less than a time required for a frequency of a wireless device wakeup receiver circuit local oscillator signal to drift beyond a predetermined tolerance.

* * * * *